March 28, 1939. C. C. HOBBS 2,151,970
INSTRUMENT FOR THE SOLUTION OF THE ASTRONOMICAL TRIANGLE
Filed Aug. 28, 1936 2 Sheets-Sheet 1

INVENTOR
Charles C. Hobbs.

March 28, 1939.  C. C. HOBBS  2,151,970
INSTRUMENT FOR THE SOLUTION OF THE ASTRONOMICAL TRIANGLE
Filed Aug. 28, 1936   2 Sheets-Sheet 2
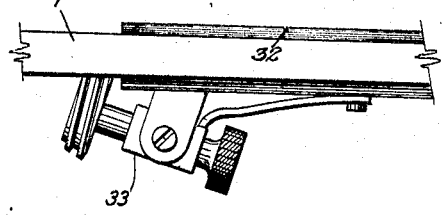
FIG_4
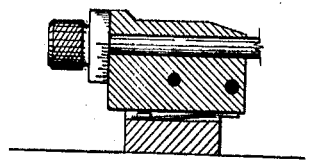
FIG_5
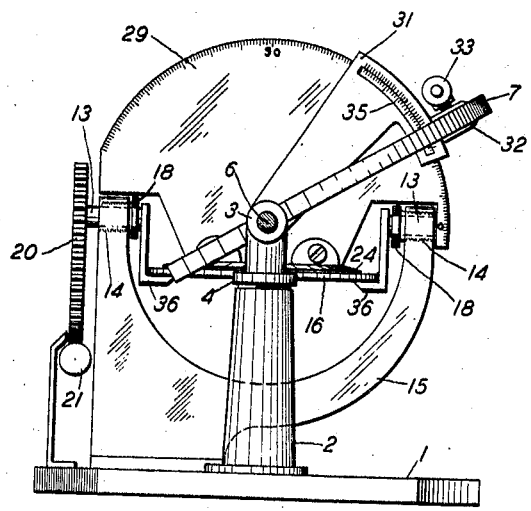
FIG_6
INVENTOR
Charles C. Hobbs.

Patented Mar. 28, 1939

2,151,970

UNITED STATES PATENT OFFICE 2,151,970

INSTRUMENT FOR THE SOLUTION OF THE ASTRONOMICAL TRIANGLE

Charles C. Hobbs, Alameda, Calif.

Application August 28, 1936, Serial No. 98,423

6 Claims. (Cl. 33—1)

This invention relates to an instrument which by mechanically reproducing the apparent motion of the sun, moon, stars or planets around the earth solves many of the problems of nautical astronomy.

This invention will solve the time sight problem and will also furnish the information necessary to lay down a line of position. It will establish the initial course and the distance for great circle sailings and will indicate the azimuth of the object from the observer.

The word "object" refers to a celestial body.

This invention will also establish the latitude and the longitude of the observer if the altitude, declination and the azimuth of the object are known.

As an example to explain how the instrument operates, two problems are selected and a step by step explanation of the method used to solve the problems are given.

The procedure to be followed in working a time sight problem is as follows: (1) For the particular day of the year take from the Nautical Almanac the declination of the object under observation. (2) Convert the Greenwich apparent civil time to degrees and parts of degrees of arc. This will establish the declination and the longitude of the object. (3) Set the declination indicator to the declination of the object. (4) The latitude arc is set to the observer's dead reckoning latitude. (5) Rotate the hour angle arc until the corrected altitude is indicated by the altitude indicator. If the observer is west of the object, the degrees and parts of degrees indicated on the hour angle arc are to be added to the longitude of the object. If the observer is east of the object, the degrees and parts of degrees indicated on the hour angle arc are to be subtracted from the longitude of the object.

The great circle distance and the initial course between two places on the earth are found by placing the latitude of the destination on the declination scale and the latitude of the observer on the latitude arc. The hour angle arc is then rotated until the hour angle arc indicates the same number of degrees as the difference of longitude between the two places. Subtract the angle indicated on the altitude arc from 90 degrees. The remainder will be the distance. The initial course will be found on the azimuth circle.

Figure 1:
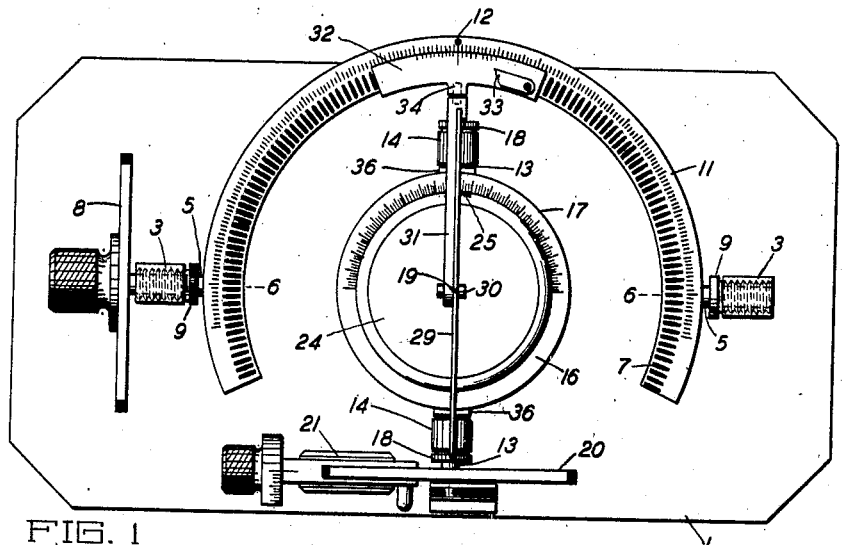

Fig. 1 is a view of the instrument as seen from a point above it. The declination arc and the azimuth circle are shown in horizontal positions. The hour angle arc, latitude arc and the altitude arc are shown in vertical positions. The supports are not shown in the drawings. The declination indicator is shown as it would be set when indicating 0 (no) degrees of declination.

Figure 2:
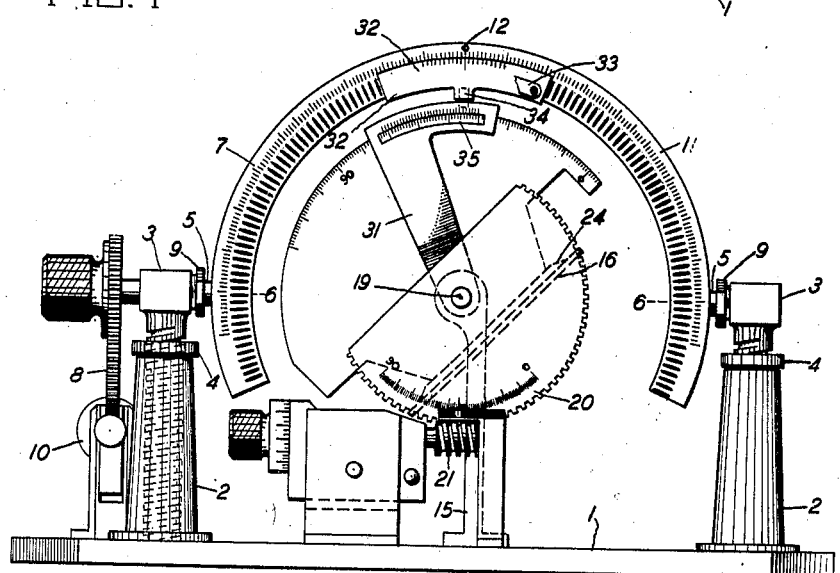

Fig. 2 is a vertical view of the instrument as it appears when the observer is facing the latitude arc. The latitude arc is set at 45 degrees of latitude. The declination indicator is set to 0 (no) degrees of declination. The latitude disc supports a unit of parts consisting of the spindle, azimuth plate and the altitude arc. The point marked 90 degrees on the altitude arc represents the observer's zenith. The latitude of the observer is represented on the instrument by rotating the latitude disc about the axis of the latitude arc thus varying the angle between the latitude disc and the polar axis. This rotation causes the point marked 90 degrees on the altitude arc to move to a position representing the observer's zenith in the celestial sphere.

The altitude of the object is determined by setting the latitude arc to the latitude of the observer. The hour angle arc is set to the correct hour angle and the declination indicator is set to the correct position on the declination scale. The angle indicated on the altitude arc by the altitude index arm will be the altitude of the object.

Figure 3:
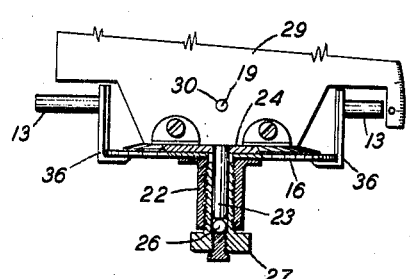

Fig. 3 shows the altitude arc which is attached to the azimuth plate. The azimuth plate is attached to the spindle. This unit of altitude arc, azimuth plate and spindle revolves in a socket which is attached to the latitude disc and is supported by ball bearings. Because these parts are connected to a declination indicator by means of an index arm, the connection causes the parts to turn about the axis of the spindle when the hour angle arc is rotated. The azimuth of the object is thereby indicated to the observer. In the drawings the position of the object is represented by the point marked 0 (no) degrees on the declination indicator. To make the drawings as clear as possible, the worm gear mechanism for moving the declination indicator has been omitted from Fig. 1 and from Fig. 2, but a detail of the gear and its mounting is shown in Fig. 4.

Fig. 4 shows the means for moving the declination indicator. A shaft which has a worm gear on one end and a knob on the other is mounted to turn in a sleeve. This sleeve is pivoted to a yoke which is connected to the declination indicator in such a way that the worm gear meshes with a gear rack on the declination arc. A strong spring bears against the sleeve, thus keeping the worm gear in mesh with the teeth on the gear rack. When it is desired to make a fast change in the setting of the declination indicator, the worm gear is raised from the gear rack and the declination indicator is moved to approximately the correct position. The gears are then allowed to mesh and the declination indicator is brought to the correct position by turning the knob either to the right or left until the desired declination is indicated by the declination indicator.

Fig. 5 shows a cut-away view of the mounting of the means to rotate the hour angle and latitude arcs. It consists of a block of metal which is pivoted to the base of the instrument. Passing through the block is a shaft which has a worm gear on one end and a knob on the other. The worm gear is not shown in the view but is shown in Fig. 2. The worm gears mesh with gear teeth on their respective arcs and are kept in mesh by strong springs. These springs are positioned between the base and the block.

Fig. 6 is a vertical section as viewed when the observer is facing the polar axis of the instrument. The hour angle arc and the means of rotating it are not shown. The position of the declination arc represents about 5 hours of time from the meridian. The latitude disc is set at a position representing 0 (no) degrees of latitude. The yoke supporting the latitude disc, and the unit of parts consisting of the azimuth plate, altitude arc, and spindle are shown. The latitude arc and an end view of the worm gear for rotating the latitude arc, the altitude index arm and an end view of the means for moving the declination indicator are also shown.

One form of my invention, which is shown in the drawings, consists of a substantial base. On opposite sides of the base and perpendicular to the face of same are suitable supports 2—2. These supports carry the polar bearings 3—3. The supports which are shown in Fig. 2 are made of three pieces consisting of (1) the body of the supports, (2) the threaded stem, (3) the adjusting collar or nut 4—4. The supports are adjusted in height by means of the collar or nut which rests on the body of the supports. The supports are bored to allow the threaded stem to be moved vertically when the collar is turned. The stems carrying the polar bearings 3—3 can be raised or lowered according to the direction of rotation.

Supported by and revolving in the bearings are shafts 5—5. The axis of the shafts represents the polar axis of the earth. On the axis of the shafts are the poles 6—6 of the instrument.

Attached to and supported by the shafts 5—5 and suspended between the supports 3—3 is what is generally called an arc 7. This arc is a plate of metal having width and depth, cut semi-circular in shape and extending 180 or more degrees in length. This part of the instrument is named declination arc. This arc simulates a part of the celestial sphere and rotates about the axis through the poles 6—6.

As it is important that the declination arc be centered at an exact position, threaded bushings 9—9 are provided to adjust the declination arc in a horizontal direction. These bushings are threaded into the supports 3—3. By turning the bushings in the proper directions the declination arc can be moved horizontally to the desired position. Fig. 1—Fig. 2.

The face of the declination arc is divided into degrees and parts of degrees. This division is named declination scale 11. The declination scale enables the operator to set the declination of the object to its correct position. Because the sun, moon, stars and planets do not always have the same declination in the celestial sphere but vary from the Equator to the poles, it is necessary to have a means for setting the declination of the object on the instrument. This is provided by having a movable declination indicator 32 which can be set to the declination of the object.

The declination arc has a gear rack on one of its sides the full length of the arc. The gear rack is shown in Fig. 1—Fig. 2. The declination indicator 32 is mounted on the declination arc and is movable throughout the length of the arc by means of a worm gear 33 which meshes with the gear rack on the declination arc. Rotation of the worm gear slowly moves the declination indicator along the declination arc. When it is desired to make a rapid change in the setting of the declination indicator, the worm gear is disengaged from the declination arc gear and the declination indicator is moved to approximately the correct position. The gears are then allowed to engage and the declination indicator is slowly brought to the correct position by rotating the worm gear. The gears are kept in mesh by a strong spring. Fig. 1 and Fig. 2 show the declination indicator without the worm gear. Fig. 4 is an edge view of the declination arc and the declination indicator. This figure shows the worm gear and the spring which keeps the gears meshed. Fig. 6 is an end view which shows the declination indicator mounted on the declination arc.

A point on the declination scale (90 degrees of arc from the poles 6—6) marked 0 (no) degrees is provided as a point reference and is named celestial equator 12. Fig. 1 and Fig 2.

A semicircular plate 8 named hour angle arc with gear teeth on its outer edge is mounted to rotate with one of the shafts which support the declination arc. Its face is divided into degrees and parts of degrees. This division indicates the angle of rotation of the hour angle arc from the meridian of the instrument. A worm gear 10 kept in mesh by the action of a strong spring causes the hour angle arc to rotate when the worm gear is turned. Fig. 2 shows an end view of the worm gear and an edge view of the hour angle arc. The same system of gearing is used to rotate the latitude arc. To simplify the drawings as much as possible, the detailed drawing of the worm gearing is not shown in connection with the hour angle arc, but is illustrated in Fig. 2 which shows the means of rotating the latitude arc. The divisions on the knob, and the spring which keeps the gears in mesh are shown in Fig. 5. The use of worm gearing results in a slow motion drive and also, to a certain extent acts as a lock. When it is desired to make an extended or swift change in the position of the hour angle arc, the worm gear is depressed and the hour angle arc rotated to approximately the desired position. The gears are then allowed to mesh and the hour angle arc is slowly brought to the desired position by turning the worm gear. The number of teeth on the hour angle arc and the pitch of the teeth on the worm gear have a definite relation to each other. This relation makes it possible to use a graduated knob or dial on the worm gear shaft as a vernier. In another form of this invention, the regular type of vernier scale which acts in conjunction with graduated marks on the hour angle arc is used. Either type of vernier may be used since each performs the same function.

Perpendicular to and horizontal with the axis of the poles 6—6 and in the plane of the celestial equator 12 are shafts, 13—13 which are supported by bearings 14—14. These are shown in Fig. 1 and Fig. 2. These bearings are supported by a yoke 15, which is firmly attached to the base 1 in a perpendicular position, Fig. 6.

Suspended from the shafts 13—13 by brackets, 36—36 is a plate named latitude disc 16. The latitude disc and the brackets rotate about the axis of the shafts 13—13, Figs. 3—6.

The latitude of the observer determines the angle between the latitude disc and the polar axis. Fig. 2 shows the latitude disc as it would be set to represent a latitude of 45 degrees. An explanation of this point is as follows: With the latitude disc parallel to the polar axis of the instrument, and representing a position of the observer at the earth's Equator, the hour angle arc indicating the object as being on the meridian of the observer, and the object having no angle of declination, the instrument would indicate an angle of 90 degrees on the altitude arc. If the observer were at a position of 90 degrees of latitude and the other conditions remained the same, the angle should be 0 (no) degrees of altitude. This result is obtained by rotating the latitude disc through 90 degrees of angle from its original position. This rotation places the latitude disc perpendicular to the polar axis. The angle between the latitude disc and the representation of the object would now be 0 (no) degrees and the instrument would indicate 0 (no) degrees of altitude on the altitude arc.

The top surface of the latitude disc is divided into degrees and parts of degrees. This division is named azimuth circle 17. The purpose of this division will be explained later. The azimuth circle is shown in Fig. 1.

Because the position of the latitude disc is very important, a means of adjustment has been incorporated for it. Threaded bushings 18—18 are provided which screw into the yoke ends 14—14. By screwing these bushings in or out of the yoke ends the position of the latitude disc can be set exactly. Figs 1—6.

At the intersection of the axis of the poles 6—6 and the axis of the shaft 13—13 is a point, 19 named Radius. This point represents the center of the earth and around this point all moving parts revolve. Fig. 1—3.

Attached to the shaft 13 is a semicircular plate 20 named latitude arc, the face of which is divided into degrees and parts of degrees. These divisions indicate the angle of rotation of the latitude arc. The divisions also indicate the angular position of the latitude disc which is attached to the same shaft. The latitude arc 20 has gear teeth on its outer edge. These teeth meshing with a worm gear 21 form a slow motion drive for rotating the latitude arc. The gear teeth on the latitude arc and the worm gear and its mounting are shown in Fig. 2. Because the gearing is the same as that described for rotating the hour angle arc, the description of its operation will apply to the method of rotating the latitude arc.

Attached to the latitude disc 16 is a socket 22 which acts as a support for a spindle 23. Rigidly connected to the spindle at its upper end and at right angles to it, is a circular disc named azimuth plate 24. This group of latitude disc, socket, azimuth plate and spindle are shown in Fig. 3. The azimuth plate and spindle are free to revolve in the socket.

A scale 25 on the azimuth plate 24 acting in conjunction with the azimuth circle 17 indicates the angle of rotation from the poles 6—6. The scale is used in this instrument for indicating the bearing of the object from the observer. The rotation of these parts will be described fully in connection with the altitude arc and the altitude index arm.

A line through the axis of the socket 22 would pass through the point of radius 19. Fig. 3.

To reduce the friction between the parts as much as possible, the lower end of the spindle 23 is supported by a steel ball 26, which rests in a threaded receptacle 27. This assembly is shown in Fig. 3.

Attached to and perpendicular to the face of the azimuth plate 24 is a semicircular plate named altitude arc 29. The face of the altitude arc is divided into degrees and parts of degrees. The geometrical center of the altitude arc 29 is at the intersection of the axis of the shafts 5—5 which support the declination arc and the axis of the shafts 13—13 which support the latitude disc. Figs. 1—3—6.

The spindle 23, azimuth plate 24 and the altitude arc 29 are firmly attached to each other and revolve as a unit.

The threaded receptacle 27 which screws into or out of the socket 22 is provided to adjust the position of the center of the altitude arc to the position representing the center of the earth 19. The adjustment is accomplished by raising or lowering the spindle which forms part of the unit. Fig. 3.

Supported by the altitude arc 29 and free to revolve about a pivot 30 which connects it to the altitude arc at the point of radius 19 is an index arm of altitude indicator 31, the outer end of which is pivoted to the declination indicator 32. Figs. 1—2—6 show these parts. The declination indicator is supported by the declination arc 7, and connected to the altitude indicator by a pin 34. The altitude index arm is free to revolve about the pin 34 connecting it to the declination indicator 32. This is necessary because in the operation of the instrument the altitude index arm must be free to turn about the pin connecting it to the declination indicator. If it were not free, the unit of parts with the altitude index arm attached would not be able to rotate about the axis of the spindle 23. The spindle 23 is shown in Fig. 3.

A description of a group of parts is necessary before explaining the movement. The parts referred to are spindle, azimuth plate and the altitude arc, all of which are firmly attached to each other. This group revolves as a unit. The altitude index arm, being attached to the altitude arc and the declination indicator, is the link connecting the unit of parts to the declination arc.

When the hour angle arc is rotated from one position to another, the rotation causes the declination indicator to describe an arc. Because the altitude index arm is connected with the declination indicator, this connection causes the altitude index arm to revolve about the pivot attaching it to the altitude arc. This movement changes the angle registered by the altitude indicator. The movement also causes the unit of parts to revolve about the axis of the spindle to a position facing the declination indicator. This movement can best be explained by example. (A) If an observer were on the Equator and the object had a declination of 0 (no) degrees, the direction of the apparent rising of the object above the horizon would be true east or 90 degrees from the poles. As the object approaches the meridian, the direction remains 90 degrees east until the meridian has been past, when the direction will change to 90 degrees west. (B) Suppose the observer were at a point on the Equator and the object had a declination of 10 degrees north. In this example, the object would apparently rise above the horizon 10 degrees north of east. As the object approaches the meridian, the direction or azimuth of the object would gradually change until it would be true north. After passing the meridian, it would continue to change direction until it set below the horizon when its azimuth would be 10 degrees north of west.

In my instrument this action is duplicated by having the altitude index arm, altitude arc and the azimuth plate revolve about the axis of the spindle. Meanwhile the altitude indicator registers the angle of the object above the horizon. This action is simultaneous.

The preferred form of my invention is herewith shown, but it is to be understood that various changes may be made in its construction by those skilled in the arts without departing from the spirit of the invention as defined in the appended claims.

Having thus described my invention, what I claim and desire to secure by Letters Patent is:

1. In an instrument for the solution of the astronomical triangle, the combination of suitable supports, an hour angle arc and a declination arc mounted to rotate on the same axis, a declination indicator movable along said declination arc, a latitude arc mounted to rotate on an axis in the same horizontal plane with and at right angles to the axis of said hour angle and declination arcs, an azimuth circle mounted to rotate on an axis at right angles to the axis of said latitude arc, an azimuth plate mounted to rotate about the axis of said azimuth circle, an altitude arc mounted to rotate on an axis at right angles to the axis of said azimuth circle, all rotatable elements so mounted with respect to each other that their axes of rotation intersect at a common point, an altitude index arm engaging said altitude arc and declination indicator causing the free elements to rotate simultaneously about the intersection of their axes when force is applied to rotatable elements, indicators for said rotating elements, substantially as described.

2. In an instrument for the solution of the astronomical triangle, the combination of suitable supports, an hour angle arc and a declination arc mounted to rotate on the same axis, a declination indicator movable along said declination arc, a latitude arc mounted to rotate on an axis in the same horizontal plane with and at right angles to the axis of said hour angle and declination arcs, an azimuth circle mounted to rotate on an axis at right angles to the axis of said latitude arc, an altitude arc mounted to rotate on an axis at right angles to the axis of said azimuth circle, an azimuth plate rotatable about the axis of said azimuth circle, said altitude arc and azimuth plate mounted to rotate as a unit, all rotating elements graduated and so mounted with respect to each other that their axes of rotation intersect at a common point, an altitude index arm mounted to rotate about the axis of said altitude arc and pivoted to said declination indicator causing the free elements to rotate simultaneously about the intersection of their axes when force is applied to rotatable elements, means to maintain the axis of said altitude arc at said point of intersection, indicators for said rotating elements, substantially as described.

3. In an instrument for the solution of the astronomical triangle, the combination of suitable supports, an hour angle arc and a declination arc mounted to rotate on the same axis, a declination indicator movable along said declination arc, a latitude arc mounted to rotate on an axis in the same horizontal plane with and at right angles to the axis of said hour angle and declination arcs, an indicating means for said latitude arc, an azimuth circle mounted to rotate on an axis at right angles to the axis of said latitude arc, an altitude arc mounted to rotate on an axis at right angles to the axis of said azimuth circle, an azimuth plate rotatable about the axis of said azimuth circle, said altitude arc and azimuth plate mounted to rotate as a unit, all rotatable elements graduated and so mounted with respect to each other that their axes of rotation intersect at a common point, a scale on said azimuth plate co-acting with said azimuth circle, an altitude index arm pivoted to the center of said altitude arc and to said declination indicator causing the free elements to rotate simultaneously about said point of intersection when rotative force is applied to said hour angle arc, means to rotate said hour angle arc, substantially as described.

4. In an instrument for the solution of the astronomical triangle, the combination of suitable supports, an hour angle arc mounted to rotate on an axis, an indicating means for said hour angle arc, a declination arc mounted to rotate on the same axis, a declination indicator movable along said declination arc, a latitude arc mounted to rotate on an axis in the same horizontal plane with and at right angles to the axis of said hour angle and declination arcs, an azimuth circle mounted to rotate on an axis at right angles to the axis of the latitude arc, an azimuth plate rotatable about the axis of said azimuth circle, an altitude arc mounted to rotate on an axis at right angles to the axis of said azimuth circle, said altitude arc mounted on and perpendicular to said azimuth plate and rotatable with it about the axis of said azimuth circle, all rotatable elements graduated and so mounted with respect to each other that their axes of rotation intersect at a common point, an altitude arm carrying an indicating means pivoted to the vertex of said altitude arc and to said declination indicator causing the free elements to rotate simultaneously about the intersection of their axes when rotative force is applied to said latitude arc, means to rotate said latitude arc, substantially as described.

5. In an instrument for the solution of the astronomical triangle, the combination of suitable supports, an hour angle arc and a declination arc mounted to rotate on the same axis, a declination indicator movable along said declination arc, a latitude arc mounted to rotate on an axis in the same horizontal plane with and at right angles to the axis of said hour angle and declination arcs, an azimuth circle mounted to rotate on an axis at right angles to the axis of said latitude arc, an altitude arc mounted to rotate on an axis at right angles to the axis of said azimuth circle, an azimuth plate rotatable about the axis of said azimuth circle, said altitude arc and azimuth plate mounted to rotate as a unit, all rotatable elements graduated and so mounted with respect to each other that their axes of rotation intersect at a common point, an altitude index arm pivoted to the center of said altitude arc and to said declination indicator causing the free elements to rotate simultaneously about the intersection of their axes when rotative force is applied to said movable declination indicator, means to move said declination indicator, substantially as described.

6. In an instrument for the solution of the astronomical triangle, the combination of suitable supports, an hour angle arc and a declination arc mounted to rotate on the same axis, a declination indicator movable along said declination arc, a latitude arc mounted to rotate on an axis in the same horizontal plane with and at right angles to the axis of said hour angle and declination arcs, an azimuth circle mounted to rotate on an axis at right angles to the axis of said latitude arc, an azimuth plate rotatable about the axis of said azimuth circle, an altitude arc mounted to rotate on an axis at right angles to the axis of said azimuth circle, said azimuth plate and altitude arc mounted to rotate as a unit, all rotating elements graduated and so mounted with respect to each other that their axes of rotation intersect at a common point, a graduated altitude index arm rotatable about the axis of said altitude arc and pivoted to said declination indicator causing the free elements to rotate simultaneously about said point of intersection when rotative force is applied to any two movable elements, substantially as described.

CHARLES C. HOBBS.